Sept. 2, 1930. C. A. HART 1,774,923
SAFETY BUMPER
Filed Sept. 5, 1929 2 Sheets-Sheet 1
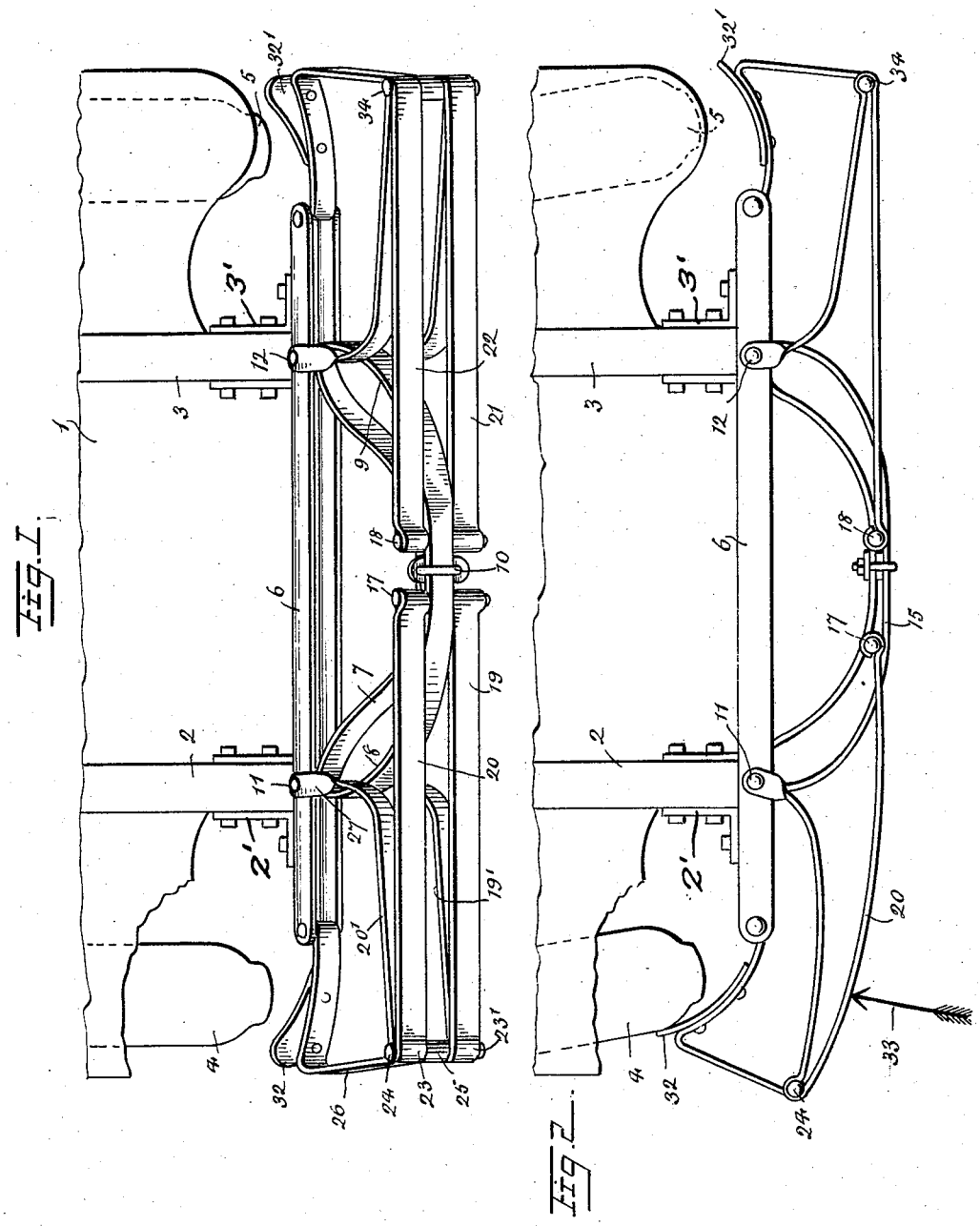
WITNESSES
H. T. Walker
A. L. Kitchin
INVENTOR
CHARLES A. HART
BY
ATTORNEYS

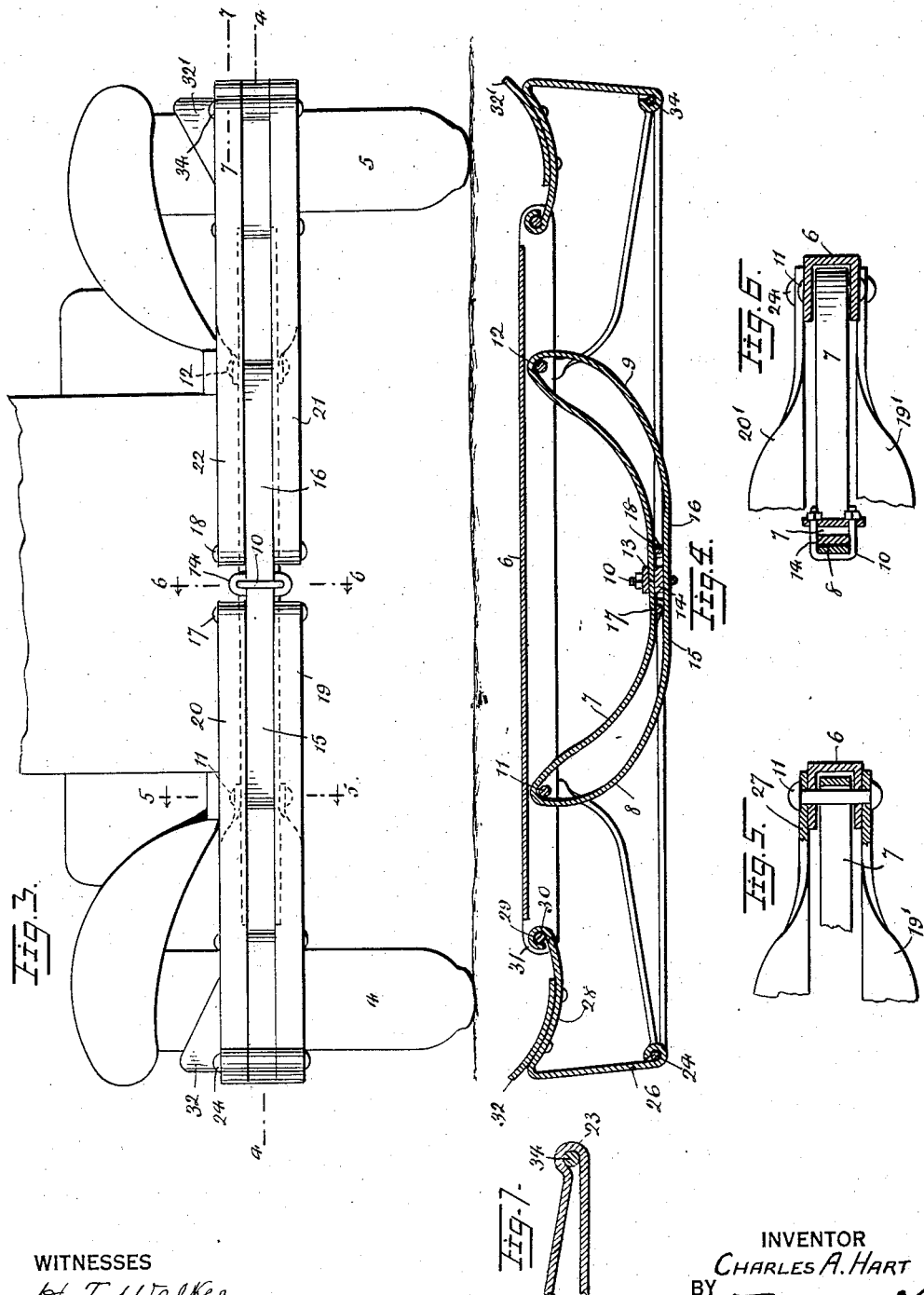

Patented Sept. 2, 1930

1,774,923

UNITED STATES PATENT OFFICE

CHARLES A. HART, OF JERSEY CITY, NEW JERSEY

SAFETY BUMPER

Application filed September 5, 1929. Serial No. 390,589.

This invention relates to bumpers for automobiles or other vehicles, and particularly to what may be termed a safety bumper, the object being to provide a structure which will give the maximum safety without interfering with the proper operation of the car.

Another object of the invention is to provide a bumper wherein a resilient action is produced so as to cause automobiles to rebound when there is a head-on collision.

A further object of the invention is to provide a bumper for automobiles wherein the parts are so formed that in case a person, automobile or other object is struck near either end of the bumper a swinging movement of part of the bumper will be given to deflect the car to one side.

In the accompanying drawings,—

Figure 1 is a front perspective view of a bumper disclosing an embodiment of the invention, the same being shown mounted on an automobile;

Figure 2 is a top plan view of the structure shown in Fig. 1, part of the bumper being shown deformed or compressed as if an object had struck the same;

Figure 3 is a front view of the structure shown in Figure 1;

Figure 4 is a sectional view through the bumper shown in Figure 3, the same being taken on the line 4—4 of Figure 3;

Figure 5 is a detail fragmentary sectional view through Figure 3 on the line 5—5;

Figure 6 is a detail fragmentary sectional view through Figure 3 on the line 6—6;

Figure 7 is a detail fragmentary sectional view through Figure 3 on the line 7—7.

Referring to the accompanying drawings by numerals, 1 indicates part of an automobile which is provided with the usual bars or members 2 and 3 forming part of the chassis. Arranged adjacent the front of the chassis are the usual front wheels 4 and 5. These parts are, of course, old and well-known and form no part of the present invention. Connected to the chassis is a channel bar 6 secured to the bars 2 and 3 by brackets 2' and 3' and suitable bolts. The channel iron 6 is rigidly secured in place and forms the base or support for the various resilient and moving parts of the bumper. As shown more particularly in Figs. 1 and 4, the bumper is provided with a spring member 7 which is formed with loops 8 and 9, whereby the parts may be clamped rigidly together by the U bolt 10 and the ends of the loops 8 and 9 fitted over the respective bolts or pins 11 and 12. From Fig. 4 it will be noted that the spring member 7 is one piece of metal and extends from the U bolt 10 to pin 11, around pin 11 back to the U bolt 10 and thence around pin 12 so that the opposite end may extend to and beneath the plate 13 clamped in position by the U bolt 10. A spacing bar or plate 14 is also clamped in place by the U bolt 10, whereby there are provided spaces or runways 15 and 16 for the bolts or pins 17 and 18. Pin 17 accommodates the looped ends of the resilient bars 19 and 20, while bolt 18 accommodates the looped ends of the resilient bars 21 and 22. Bar 20 is provided with a bent portion 23 forming substantially an eye, as shown in Fig. 7, whereby the pin 24 may readily fit therein and also may readily receive the eye or looped end 25 of the spring 26. The opposite end of the bumper is formed in an identical manner and therefore will need no additional description. From the looped portion 23 the bar 20 merges into a resilient brace 20' which is twisted at the end to form an apertured section 27 through which bolt 11 passes. Bar 19 is likewise formed with an eye 23 similar to the eye or looped portion 23 and the looped portion or eye 23' merges into a resilient bracing bar 19', which in turn is twisted at the end similar to the portion 27 so as to accommodate bolt 11, as shown particularly in Fig. 5. The spring 26 is formed with a looped portion 28 having an eye 29 through which the pin or bolt 30 extends. The pin or bolt 30 extends through suitable ears or extensions 31. A deflecting plate 32 is riveted or otherwise secured to the bolt portion 28, so that when an object strikes the bars 19 and 20 substantially at the place indicated by the arrow 33 (Fig. 2) the parts will bow and the bolt or pin 17 will slide along the passageway 15 so that the deflecting member 32 will strike against the wheel 4 and deflect the wheel somewhat and any forward movement of the automobile will be somewhat to one side. This will prevent the person or object from being run over. Where two cars come together in this manner the front wheels of each automobile will be deflected, so that they will be deflected in opposite directions, and thereby any injury produced will be reduced to a minimum. As both sides of the bumper are identical, it will be evident that the same action takes place in case the bumper is struck on the opposite side or near the opposite side. For instance, if the bumper is struck about one-third the distance from pin 34 to pin 18, the deflector 32' will function to deflect the automobile in a given direction, and the same is true when the deflector 32 is functioning. In case there is a direct head-on collision, the bumper will cushion the blow and usually produce a rebounding action, as most parts of the bumper are resilient and mounted to spring or move either pivotally or slidably to take care of different strains. The formation of the bumper with resilient or moving parts results in a minimum injury when a person or article is struck, and in case the person or article is struck near either end of the bumper, the oncoming automobile will be deflected to one side.

What I claim is:—

1. A bumper, comprising a rigid bar, means for connecting said bar rigidly to the chassis of an automobile, and a plurality of resilient bars carried by said rigid bar, certain of said resilient bars being movable bodily substantially longitudinally.

2. A bumper, including a rigid bar, a substantially V-shaped spring pivotally connected with each end of said bar, a plurality of resilient bars connected to the outer ends of said springs, said bars having front portions extending towards each other and rear portions pivotally mounted on said rigid bar, and a connecting bracing spring pivotally mounted on said rigid bar and slidably connected with said front portions.

3. A bumper for automibles, comprising a rigid bar, means for connecting said rigid bar to the automobile, a plurality of front bars, each front bar having a bent section extending rearwardly and pivotally mounted on said rigid bar, a spring pivotally connected at both ends to said rigid bar and formed with the center portion interlocking with said front bars for holding the same in operating position, and end springs for connecting said front bars with said rigid bar, each of said end springs being formed with means for striking a front wheel of the automobile when pressed rearwardly, whereby the wheel will be turned to one side for deflecting the course of the automobile.

4. A bumper for automobiles and similar vehicles, including a rigid structure connected with the automobile, and a resilient structure carried by the rigid structure, said resilient structure being formed with a swinging deflecting member at each end positioned to engage and move one of the front wheels of the automobile when deflected to a certain extent, whereby the automobile is deflected from its course.

5. A bumper, including a rigid structure, a set of resilient front members carried by said rigid structure and a swinging structure at each end formed with a wheel deflecting plate positioned to deflect the wheels to one side when the bumper is struck near either end.

6. A bumper for automobiles, including a channel-shaped rigid bar, brackets for securing said bar to the chassis of an automobile, said channel-shaped bar having the side flanges extend at the ends beyond the center part of the bar, a pin extending through each end of said bar, a swinging spring pivotally connected with said bar through said pins, a pair of front bars, means for pivotally connecting said springs to said front bars, and a plurality of resilient members for resiliently holding said front bars in a given position, said members being pivotally connected with said rigid bar.

7. A bumper for automobiles, including a supporting member, means for connecting the same with the chassis of an automobile, a pair of resilient front bars, each of said front bars having bowed resilient extensions pivotally connected with said supporting member, a double looped spring carried by said supporting member, and a pair of pins carried by said front bars for pivotally and slidably connecting the front bars with said double bowed spring.

8. A bumper for automobiles, comprising a stiff supporting bar, a double bowed spring, a clamp for clamping the ends of the spring against the center of the bowed portion of the spring, a plurality of pairs of front resilient bars, a pin carried by each pair of bars, said pins extending through the looped portion of said double bowed spring, and means for pivotally connecting the outer end of each of said bars to said supporting bar, whereby when pressure is brought to bear on the outer part of said front bars, the same will bow and also move longitudinally away from each other.

9. A bumper, including a rigid supporting bar adapted to be connected with an automobile, a plurality of pairs of front contact bars normally arranged parallel to said supporting bar, and a plurality of resilient means for connecting said front bars to said supporting bar.

10. A bumper, including a stiff supporting bar adapted to be connected with an automobile, a plurality of pairs of front contact bars, and resilient means for connecting said contact bars with said supporting bar, said resilient means being mounted to permit said contact bars to slide transversely of the automobile when pressure is brought to bear thereon.

11. A bumper for automobiles, including a bar adapted to be connected with an automobile, a pair of front resilient contact bars, a substantially V-shaped spring connecting one end of each of the contact bars with said supporting bar, and a spring for normally holding said contact bars in position, said spring having the ends looped, the looped portions being pivotally connected with said supporting bar and the center slidably connected with said contact bars.

CHARLES A. HART.